(12) United States Patent	(10) Patent No.:	US 8,416,564 B2
Chang	(45) Date of Patent:	Apr. 9, 2013

(54) EXPANSION INTERFACE MODULE HAVING SIGNAL GAIN CIRCUIT

(76) Inventor: Nai-Chien Chang, Linkou Township, Taipei County (TW)

( * ) Notice: Subject to any disclaimer, the term of this patent is extended or adjusted under 35 U.S.C. 154(b) by 220 days.

(21) Appl. No.: 12/984,657

(22) Filed: Jan. 5, 2011

(65) Prior Publication Data

US 2012/0170195 A1   Jul. 5, 2012

(30) Foreign Application Priority Data

Mar. 22, 2010   (TW) ................................ 99204985 U

(51) Int. Cl.
*G06F 1/16* (2006.01)
(52) U.S. Cl.
USPC .............. 361/679.4; 361/679.41; 361/679.6; 361/728; 312/223.1; 312/223.2
(58) Field of Classification Search ................ 361/679.4
See application file for complete search history.

(56) References Cited

U.S. PATENT DOCUMENTS

| | | | | |
|---|---|---|---|---|
| 6,067,226 A * | 5/2000 | Barker et al. | .............. | 361/679.6 |
| 7,200,002 B2 * | 4/2007 | Peng et al. | ................ | 361/679.4 |
| 7,602,611 B2 * | 10/2009 | Peng et al. | ..................... | 361/728 |
| 7,805,559 B1 * | 9/2010 | Stumpf et al. | ................ | 710/313 |
| 7,898,803 B2 * | 3/2011 | Huang | ........................ | 361/679.6 |
| 2007/0035915 A1 * | 2/2007 | Chen et al. | ..................... | 361/679 |
| 2007/0258204 A1 * | 11/2007 | Chang et al. | .................. | 361/683 |
| 2007/0270026 A1 * | 11/2007 | Lo | .................. | 439/499 |
| 2009/0135553 A1 * | 5/2009 | Bao | ............................ | 361/679.4 |
| 2009/0231790 A1 * | 9/2009 | Chi | ............................ | 361/679.6 |
| 2010/0157524 A1 * | 6/2010 | Soffer | ...................... | 361/679.58 |
| 2010/0290178 A1 * | 11/2010 | Sun | ............................ | 361/679.4 |
| 2011/0216491 A1 * | 9/2011 | Lian et al. | .................. | 361/679.4 |
| 2012/0030394 A1 * | 2/2012 | Bird | ............................ | 710/305 |

* cited by examiner

*Primary Examiner* — Anthony Q Edwards
(74) *Attorney, Agent, or Firm* — Chun-Ming Shih; HDLS IPR Services

(57) ABSTRACT

An expansion interface module having a signal gain circuit is disposed on a case panel of a computer and electrically connected to a main board which is disposed within the computer. The expansion interface module includes a circuit board, a connecting port, a signal gain circuit and a plurality of connectors. The connecting port, the signal gain circuit and the connectors are located at the circuit board and electrically connected thereto. The main board delivers signal to the circuit board through a cable which is connected to the connecting port located on the circuit board, the signal gain circuit amplifies and enhances the signal, and then the connectors output the amplified and enhanced signal to external devices, thus, the signal will not be attenuated, damaged or lost during over transmission distance.

13 Claims, 4 Drawing Sheets

EXPANSION INTERFACE MODULE HAVING SIGNAL GAIN CIRCUIT

BACKGROUND OF THE INVENTION

1. Field of the Invention

The present invention is related to an extensional module, and more particularly to an extension interface module which can amplify and enhance signal and then output the amplified and enhanced signal.

2. Description of Prior Art

The universal serial bus (USB) transferring interface has an advantage of supporting hot swapping, (namely, plug-and-play), more particular, many electronic devices such as keyboard, mouse, portable hard driver and webcam are connected to computers through the USB transferring interface for convenient using. USB transferring interface is becoming a most popular transferring interface of computer.

However, a main board of a computer has just a fixable allocation space for disposing limited amount of USB ports. When users have too many devices having USB port, the USB port will be inadequate. Moreover, in most of computers, the USB ports are located at a back-end of the computer, thus, it is inconvenience for users during plugging and pulling the USB devices.

As described above, an expansion interface was disclosed, such as lead lines of the computer, as shows in FIG. 1, which is a perspective view of conventional USB lead line. The lead line 1 is an integrated circuit board, which is integrated with a head phone jack 11, a microphone jack 12 and a USB connector 13 into a circuit board, and the circuit board is electrically connected to a main board through a cable 14.

However, some USB devices, such as flash drives, are directly connected to the USB connector 13 of the lead line 1 through USB plug, and the others, such as portable optical disk drive or portable hard drive, are connected to the USB connector 13 of the lead line through an external transmission line (or called extended line). The cable 14 of the lead line 1 has a predetermined length. The sum length of the cable 14 and the extended line will exceed the standard transmission distance of USB when the extended line is over length. And the length of the cable 14 or the expended line will exceed the standard transmission distance when the lead line 1 is poorly designed or using a special requirement with very long expended line. Therefore, the signal or data delivered from the main board will be attenuated, damaged or lost in the transfer process during the over-length of transferring distance. In the situation said above, the lead line does not have to need to be used.

Furthermore, the USB transmission interface has been developed to USB 3.0, and the transmission rate is raised to 5 Gbps from 480 Mbps of USB 2.0. The specifications of USB 2.0 are no longer applicable when the transmission rate has been raised. As a result, signal attenuation, damage and loss in the high transmission rate might occur.

SUMMARY OF THE INVENTION

In order to solve the above-mentioned problem, an expansion interface module having signal gain circuit is disclosed for amplifying and enhancing signal delivered from a main board, and output the amplified and enhanced signal to external devices connected to the expansion interface module.

Therefore, the expansion interface module is disposed on a case panel of a computer and electrically connected to a main board which is disposed within the computer. The expansion interface module includes a circuit board, a connecting port, a signal gain circuit and a plurality of connectors. The connecting port, the signal gain circuit and the connectors are located at the circuit board and electrically connected thereto. The main board delivers signal to the circuit board through a cable which is connected to the connecting port located on the circuit board. The signal gain circuit amplifies and enhances the signal delivered from the main board and then outputs the amplified and enhanced signal to external devices electrically connected to the connectors.

The expansion interface module according to the present invention amplifies and enhances signal delivered from the main board of the computer through the cable having predetermined length, then output the signal to an external USB device which is connected to the USB connector of the expansion interface module, thus, can effectively prevent signal attenuation, damage and loss during the over-length of the cable or extended line which connected between the external USB device and the USB connector.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter to a preferable embodiment, being not used to limit its executing scope.

Figure 1:
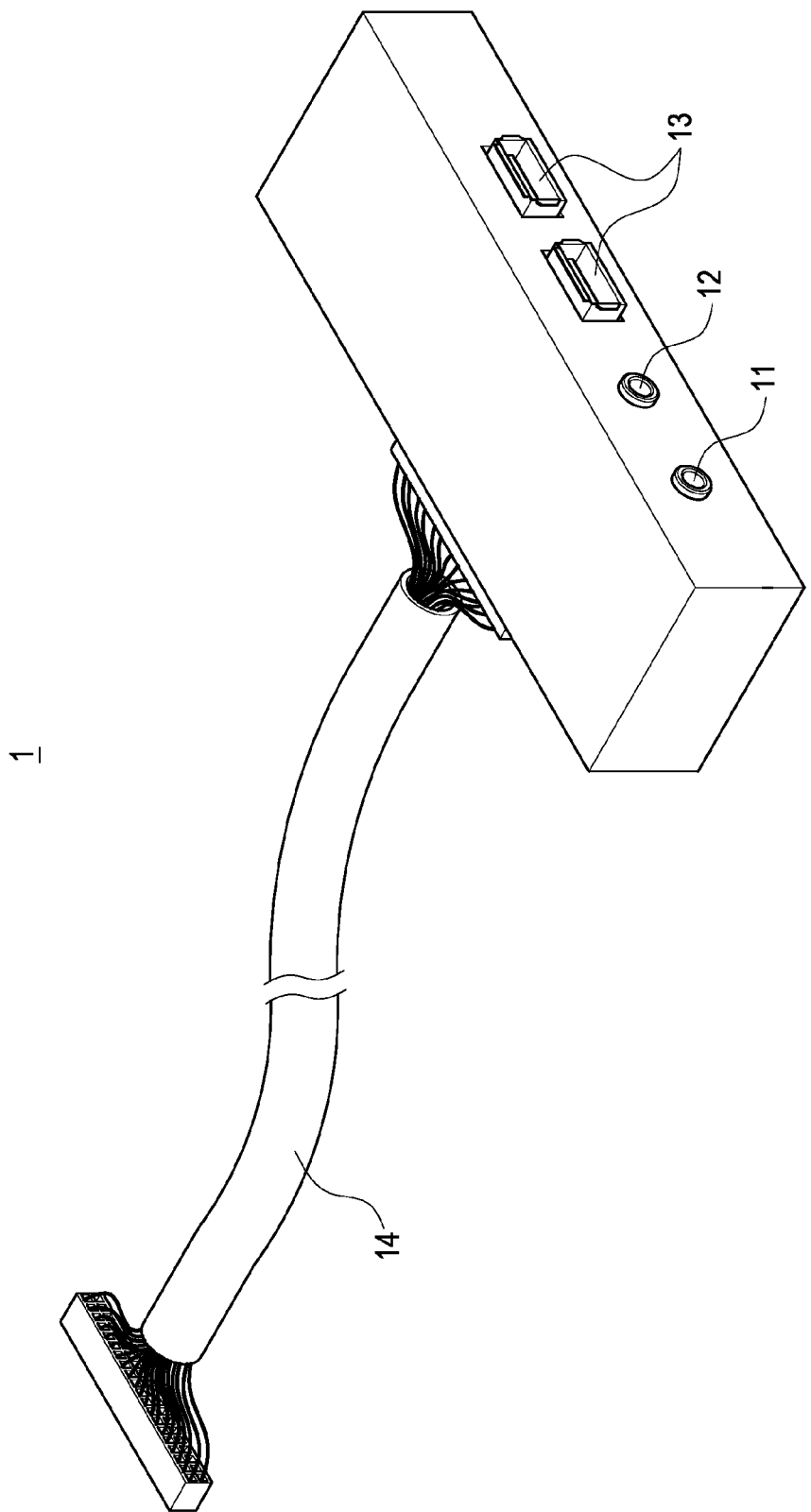
FIG. 1 is a perspective view of conventional USB lead line.
Figure 2:
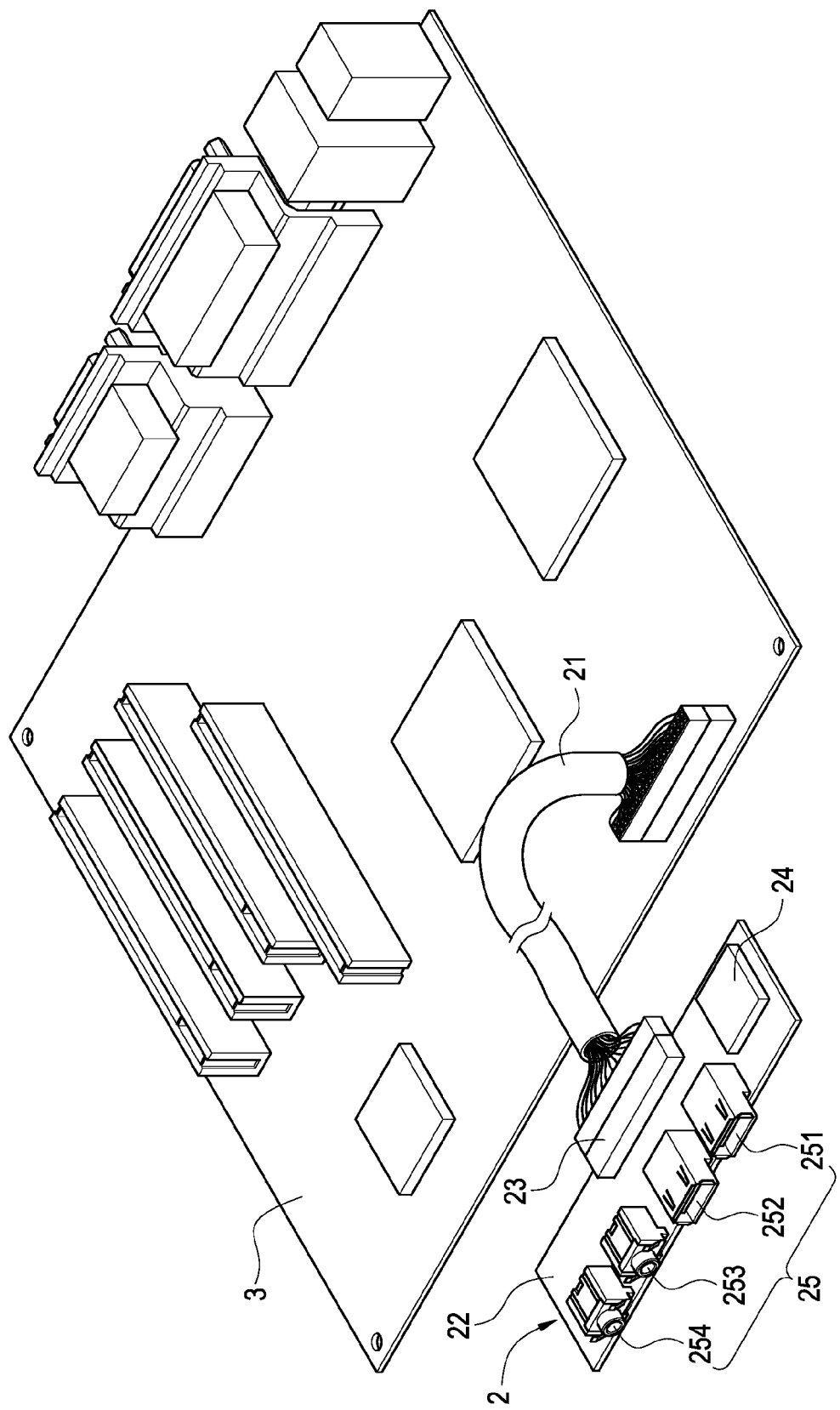
FIG. 2 is a perspective view of an expansion interface module having signal gain circuit of the present invention.

Referenced is made to FIG. 2, which is a perspective view of an expansion interface module having signal gain circuit of the present invention. An expansion interface module 2 is connected to a main board 3 of a computer 4 (as shown in FIG. 4) through a cable 21 which can deliver signal, such as controlling commands or data, to the expansion interface module 2.

The expansion interface module 2 includes a circuit board 22, a connecting port 23, a signal gain circuit 24 and a plurality of connectors 25. The connecting port 23 is located at one side of the circuit board 22 and electrically connected thereto. The connecting port 23 is used for plugging the cable 21 to electrically connect the circuit board 22 and the main board 3 such that the circuit board 22 receives the signal which is output from the main board 3.

The signal gain circuit 24 can be a repeater, which is an integrate circuit (IC) chip. The signal gain circuit 24 is located at the circuit board 22 and electrically connected thereto. The circuit board 22 receives the signal delivered by the main board 3 through the connecting port 23 and then amplifies and enhances the signal. The connectors 25 located at the circuit board 22 are opposite to the connecting post 23 and electrically connected to the circuit board 22 for outputting the amplified and enhanced signal.

Figure 3:
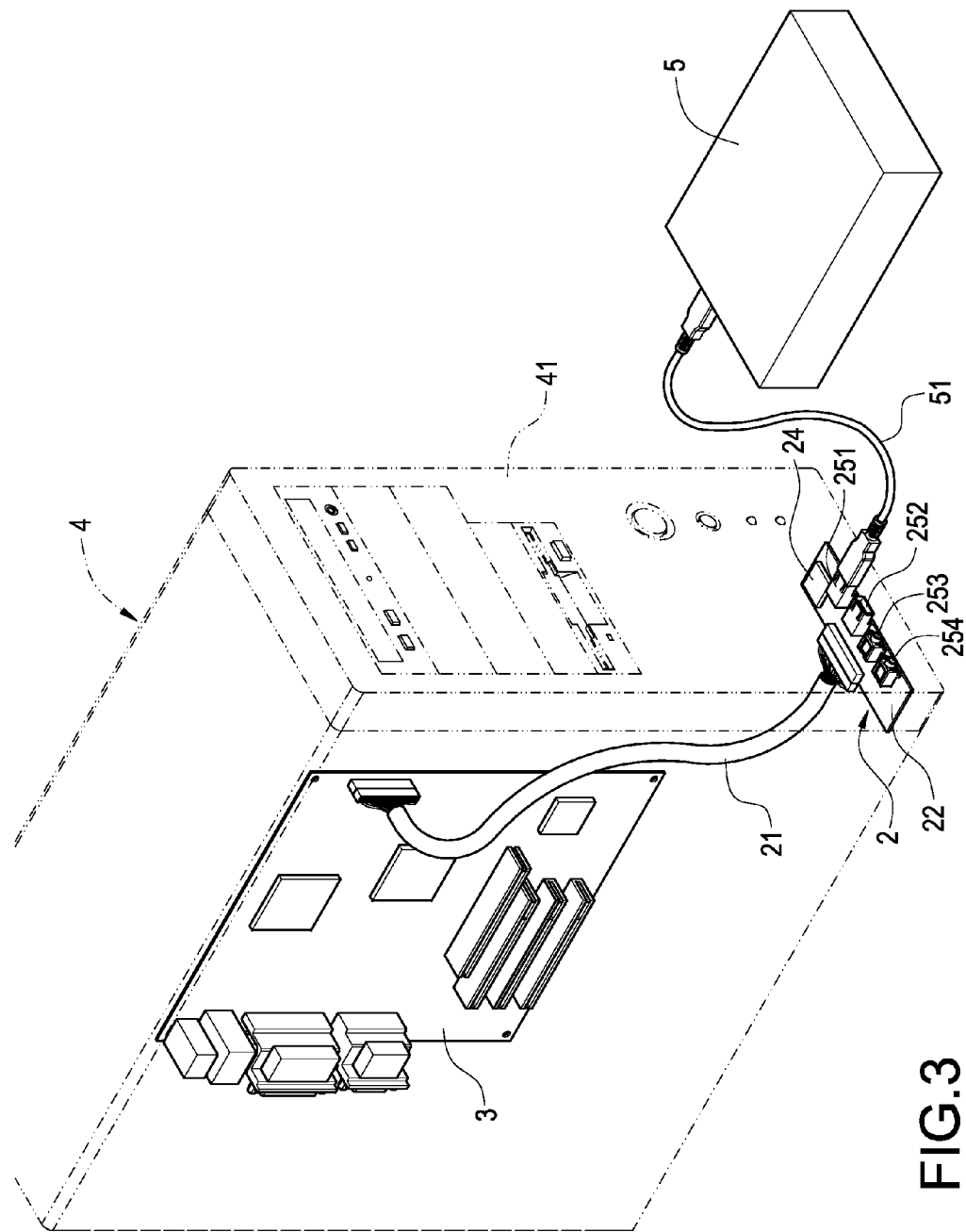
FIG. 3 is a perspective view of a first application embodiment of the expansion interface module having signal gain circuit.
Figure 4:
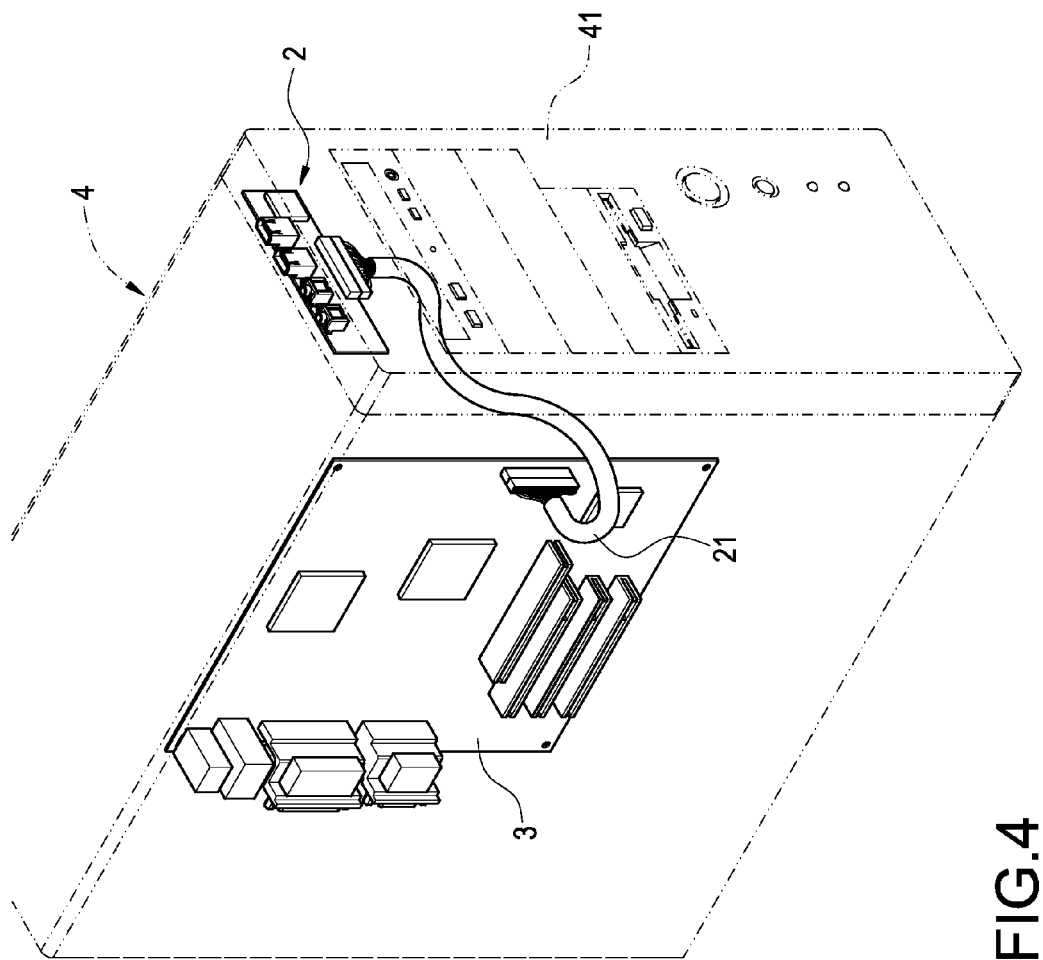
FIG. 4 is a perspective view of a second application embodiment of the expansion interface module having signal gain circuit.

Referenced is made to FIG. 3 and FIG. 4, which are first and second application embodiment of the expansion interface module having signal gain circuit. The expansion interface module 2 is electrically connected to the main board 3 through the cable 21 which has a predetermined length, thus the cable 21 provides a predetermined distance between the expansion interface module 2 and the main board 3. The expansion interface module 2 is disposed within the computer 4, and in more particularly, the expansion interface module 2 is located at a front-end or a top-end of a case panel 41 which is far away from the main board 3, thus users can conveniently plug external devices from the front-face or top-face of the case panel. The connectors 25 can be universal serial bus (USB) 3.0 connectors 251, USB 2.0 connectors 252, head phone jack 253 and/or microphone jack 254 for allowing external devices such as portable hard drivers, speakers or microphones having USB 3.0 transmission interface to be electrically connected to the main board 3. However, in the practical application, the connectors can be adjusted based on the different situations and can be for example, external serial advanced technology attachment (eSATA), firewire (IEEE1394), high definition multimedia interface (HDMI), and DisplayPort. Referring to FIG. 3 again, a portable hard driver with USB3.0 transmission interface is connected to the connector 25 which having the USB3.0 connectors 251 through a transferring cable 51. The main board 3 delivers signal to the expansion interface module 2 through the cable 21, the expansion interface module 2 amplifies and enhances the signal by the signal gain circuit 24, and then outputs the amplified and enhanced signal to the portable hard driver 5 through the connector 251 and the transferring cable 51. Moreover, the portable hard driver 5 can also deliver another signal to the expansion interface module 2 through the transferring cable 51, the expansion interface module 2 amplifies and enhances the signal by the signal gain circuit and delivers the amplified and enhanced signal to the main board through the cable 21.

If the space within the computer case has poolly design, the main board 3 and the expansion interface module 2 must be far away from each other and that causes over-length of the cable 21.

Moreover, for convenient using or special using, the longer transferring cable 51 must be used for connecting the external device 5 and the expansion interface module 2. The signal delivered or received from the main board 3 or the external device 5 tend to be attenuated, damaged or lost in the transfer process during the over-length transferring distance. The advantage of expansion interface module 2 of the present invention is that the signal is amplified and enhanced at a mid-point (namely, the expansion interface module 2) between the delivered-end and the received-end, thus effectively preventing signal attenuation, damage and loss during the over-length of the cable 21 or the transferring cable 51.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An expansion interface module having signal gain circuit electrically connected to a main board which is disposed within a computer housing through a cable, the expansion interface module comprising:
   a circuit board always disposed within the computer housing;
   a connecting port located at one side of the circuit board and electrically connected to the circuit board through the cable for receiving signal outputted from the main board;
   a signal gain circuit always disposed within the computer housing, located at the circuit board and electrically connected to the circuit board for amplifying and enhancing the signal received by the connecting port; and
   a plurality of connectors located at one side of the circuit board and opposite to a side where the connecting port is located and electrically connected to the circuit board for outputting the signal which is amplified and enhanced by the signal gain circuit;
   wherein the connectors are physically connected to an external device or connected to an external device through a transferring cable for outputting the amplified and enhanced signal to the external device.

2. The expansion interface module having signal gain circuit in claim 1, wherein the connectors are USB 2.0 connectors.

3. The expansion interface module having signal gain circuit in claim 1, wherein the connectors are USB 3.0 connectors.

4. The expansion interface module having signal gain circuit in claim 1, wherein the connectors are eSATA connectors.

5. The expansion interface module having signal gain circuit in claim 1, wherein the connectors are IEEE 1394 connectors.

6. The expansion interface module having signal gain circuit in claim 1, wherein the connectors are HDMI connectors.

7. The expansion interface module having signal gain circuit in claim 1, wherein the connectors are DisplayPort connectors.

8. The expansion interface module having signal gain circuit in claim 3, wherein the signal gain circuit is a repeater.

9. The expansion interface module having signal gain circuit in claim 8, wherein the repeater is an integrated circuit chip.

10. The expansion interface module having signal gain circuit in claim 9, wherein the expansion interface module is located at a frond-end of a case panel of the computer.

11. The expansion interface module having signal gain circuit in claim 9, wherein the expansion interface module is located at a top-end of a case panel of the computer.

12. The expansion interface module having signal gain circuit in claim 9, wherein the connectors includes a head phone jack.

13. The expansion interface module having signal gain circuit in claim 9, wherein the connectors include a microphone jack.

* * * * *